US009606877B2

(12) United States Patent
McHugh et al.

(10) Patent No.: US 9,606,877 B2
(45) Date of Patent: Mar. 28, 2017

(54) RESTORING NON-TRANSACTIONAL MESSAGES IN QUEUES FOR ADVERTISEMENT DATA FLOW PROCESSING

(71) Applicant: Facebook, Inc., Menlo Park, CA (US)

(72) Inventors: Jason McHugh, Seattle, WA (US); Michael Pechuk, Sammamish, WA (US)

(73) Assignee: Facebook, Inc., Menlo Park, CA (US)

( * ) Notice: Subject to any disclaimer, the term of this patent is extended or adjusted under 35 U.S.C. 154(b) by 163 days.

(21) Appl. No.: 14/715,393

(22) Filed: May 18, 2015

(65) Prior Publication Data

US 2016/0342485 A1 Nov. 24, 2016

(51) Int. Cl.
*G06F 11/14* (2006.01)
*G06Q 30/02* (2012.01)

(52) U.S. Cl.
CPC ...... *G06F 11/1471* (2013.01); *G06F 11/1474* (2013.01); *G06Q 30/0241* (2013.01); *G06F 2201/80* (2013.01); *G06F 2201/805* (2013.01); *G06F 2201/82* (2013.01); *G06F 2201/84* (2013.01)

(58) Field of Classification Search
CPC ............ G06F 11/1471; G06F 11/1474; G06Q 30/0241
See application file for complete search history.

(56) References Cited

U.S. PATENT DOCUMENTS

| | | | | |
|---|---|---|---|---|
| 2008/0126833 A1* | 5/2008 | Callaway | ............ | G06F 11/1641 714/6.1 |
| 2008/0267209 A1* | 10/2008 | Gallagher | ............... | H04L 47/10 370/429 |
| 2009/0018911 A1* | 1/2009 | An Chang | ............. | G06Q 30/02 705/14.14 |
| 2009/0217178 A1* | 8/2009 | Niyogi | ................... | G06Q 10/00 715/753 |
| 2010/0138292 A1* | 6/2010 | Park | .................. | G06F 17/30997 705/14.46 |
| 2010/0217664 A1* | 8/2010 | Steelberg | ........... | G06Q 30/0244 705/14.43 |
| 2013/0117237 A1* | 5/2013 | Thomsen | .......... | G06F 17/30377 707/683 |

(Continued)

*Primary Examiner* — Yolanda L Wilson
(74) *Attorney, Agent, or Firm* — Fenwick & West LLP (57) ABSTRACT

The disclosed online system includes a number of processing blocks, including a feeding service that sends a data stream and a consuming service that receives a data stream, without sending back acknowledgements for the data (i.e., "nontransactional"). The system handles failure in the feeding service and/or the consuming service by adding reference points into the data stream and backing up a current sum that is maintained by the consuming service. Upon a failure of the consuming service, the system obtains the last reference point, restores the backup copy of the database, and starts reading the backup copy from that check point. To address a failure of the feeding service, the feeding service creates an identifier for each message in the data stream, and upon failure, the consuming service checks for messages that have the same identifier within a specified period of time, and discards any duplicate messages.

19 Claims, 4 Drawing Sheets

(56) References Cited

U.S. PATENT DOCUMENTS

| | | | | |
|---|---|---|---|---|
| 2013/0145371 A1* | 6/2013 | Brunswig | ........... | G06F 11/1474 |
| | | | | 718/101 |
| 2013/0332262 A1* | 12/2013 | Hunt | ...................... | G06Q 30/02 |
| | | | | 705/14.43 |
| 2014/0067522 A1* | 3/2014 | Mehta | ................ | G06Q 30/0244 |
| | | | | 705/14.43 |
| 2014/0317448 A1* | 10/2014 | Rash | ................... | G06F 11/1446 |
| | | | | 714/15 |

* cited by examiner

RESTORING NON-TRANSACTIONAL MESSAGES IN QUEUES FOR ADVERTISEMENT DATA FLOW PROCESSING

BACKGROUND

This disclosure relates generally to online advertising, and more specifically to restoring non-transactional messages in queues for advertisement data flow processing.

Online systems, such as an advertising platform, include one or more ad servers that provide a centralized location for advertisers to manage advertisement or ad campaigns and report information about those campaigns. The online system may perform various processes or services that participate in the data flow processing for serving an advertisement. For each service, the online system uses messages to keep track of the service status. For example, messages may inform the online system that an ad was shown, along with the clearing price of the ad. These messages are stored in queues that decouple the various independent services that process the data stream. In other words, the queue allows data to be transferred between independent services without sending back acknowledgements that the data was sent or received.

In a distributed system, queues provide availability, but typically lack strong guarantees regarding certain queue semantics, such as the delivery of messages to and from the queue. For example, the queue may guarantee that a message including a notification of an ad being served will be sent from one service. But such a guarantee does not prevent the message from being sent multiple times from the queue. Nor does such a guarantee ensure that the message will be received by the other service. Accordingly, conventional queue guarantees do not provide a mechanism to recover from a failure by one or both services on either side of the queue.

SUMMARY

An online system includes a number of processing blocks, including a feeding service that sends a data stream and a consuming service that receives a data stream, without sending back acknowledgements for the data (i.e., "non-transactional"). In a case where the system is an advertisement platform, the feeding service may be a limiter (which applies limits to ad impressions), and the consuming service may be an aggregator (which aggregates data about impressions for use, e.g., by a pacer), and the data streams may comprise pairs of data including a limit identifier and a cost associated with an impression. The system handles failure in the feeding service and/or the consuming service by adding checkpoints into the data stream and backing up a current sum that is maintained by the consuming service. Upon a failure of the consuming service, the system obtains the last checkpoint, restores the sum, and starts over from that checkpoint. To address a failure of the feeding service, the feeding service creates a unique code or identifier for each data point in the stream, and upon failure, the consuming service returns to the last checkpoint and restarts, ignoring data points containing a code that has already been aggregated.

The figures depict various embodiments of the disclosure for purposes of illustration only. One skilled in the art will readily recognize from the following discussion that alternative embodiments of the structures and methods illustrated herein may be employed without departing from the principles of the embodiments described herein.

DETAILED DESCRIPTION

System Architecture

Figure 1:
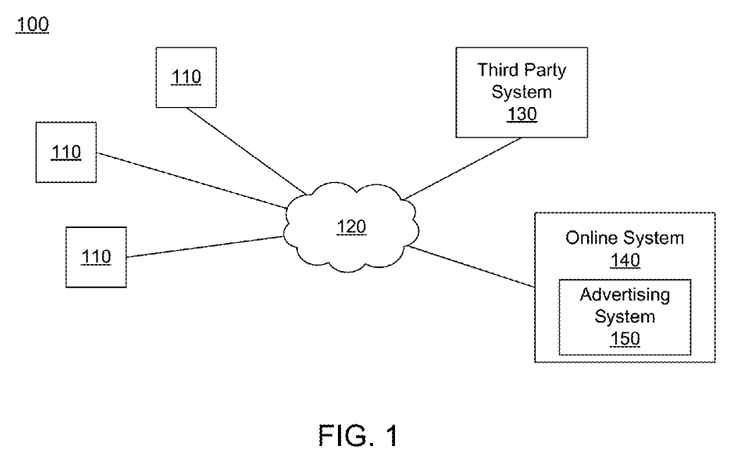
FIG. 1 is a block diagram of a system environment in which an online system operates, in accordance with an embodiment.

FIG. 1 is a block diagram of a system environment 100 for an online system 140, such as a social networking system. The system environment 100 shown by FIG. 1 comprises one or more client devices 110, a network 120, one or more third-party systems 130, and the online system 140. In some embodiments, the online system 140 includes an advertising system 150 or is itself an advertising system 150. In other embodiments, the online system 140 and the advertising system 150 are separate entities or computing systems. For example, the online system 140 may be a social networking system and the advertising system 150 may be an advertising platform that interacts with the social networking system via the network 120. In alternative configurations, different and/or additional components may be included in the system environment 100. The embodiments described herein can be adapted to various different types of online systems, such as social networking systems.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIGS. 2A and 2B. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130. For example, in one embodiment the third party system 130 is an advertising (ad) exchange system that provides a digital marketplace that enables advertisers and publishers to buy and sell advertising space through real-time auctions.

Figure 2A:
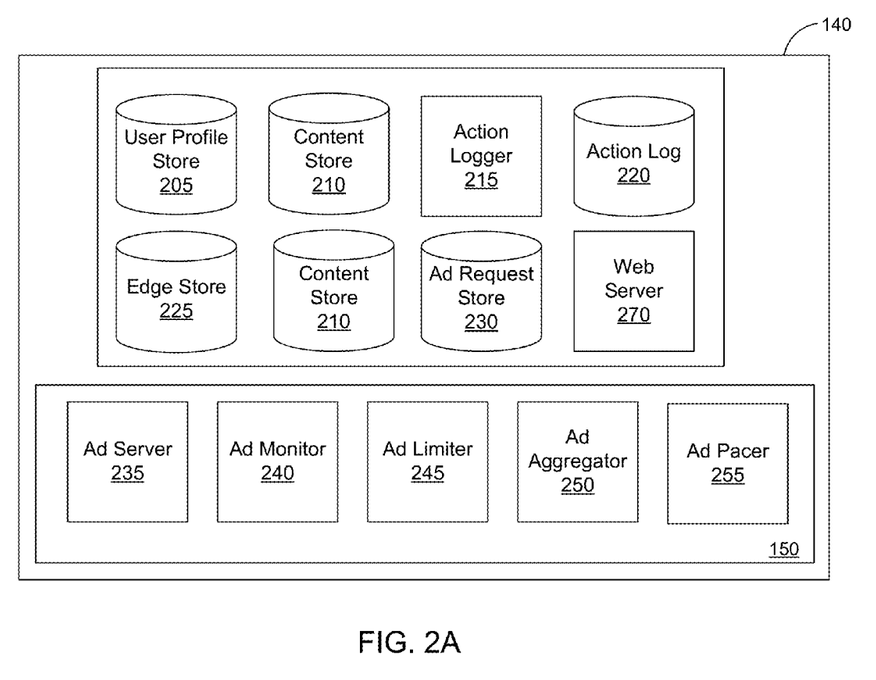
FIG. 2A is a block diagram of an online system, in accordance with an embodiment.

FIG. 2A is a block diagram of an architecture of the online system 140. The online system 140 shown in FIG. 2A includes a user profile store 205, a content store 210, an action logger 215, an action log 220, an edge store 225, and a web server 270. In some embodiments, the online system 140 includes an advertising system 150, as shown in FIG. 2A. While, in other embodiments, the online system 140 and the advertising system 150 are separate computing systems as further described with respect to the advertising system 150. In some embodiments, the online system 140 may include additional, fewer, or different components for various applications. Conventional components such as network interfaces, security functions, load balancers, failover servers, management and network operations consoles, and the like are not shown so as to not obscure the details of the system architecture.

In some examples, the online system 140 is a social networking system, though it can take on the form of other online systems, as well. FIG. 2A illustrates an example of components that might be included in the online system 140 where it is a social networking system. If the online system 140 is something other than a social networking system, such as a more general advertising platform, then certain of the social networking components, such as an edge store 225 may be not included or otherwise modified to fit that system.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding social networking system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220. Information stored in the user profile store 205 may be used by the advertising system 150 to place ads on websites accessed by a user of the online system 140 associated with the user profile store 205.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the social networking system using a brand page associated with the entity's user profile. Other users of the social networking system may connect to the brand page to receive information posted to the brand page or to receive information from the brand page. A user profile associated with the brand page may include information about the entity itself, providing users with background or informational data about the entity.

The content store 210 stores objects that each represents various types of content. Examples of content represented by an object include a page post, a status update, a photograph, a video, a link, a shared content item, a gaming application achievement, a check-in event at a local business, a brand page, or any other type of content. Social networking system users may create objects stored by the content store 210, such as status updates, photos tagged by users to be associated with other objects in the social networking system, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with those users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a mobile device, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe rate of interaction between two users, how recently two users have interacted with each other, the rate or amount of information retrieved by one user about an object, or the number and types of comments posted by a user about an object. The features may also represent information describing a particular object or user. For example, a feature may represent the level of interest that a user has in a particular topic, the rate at which the user logs into the online system 140, or information describing demographic information about a user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or another user in the online system 140 based on the actions performed by the user. A user's affinity may be computed by the online system 140 over time to approximate a user's interest for an object, a topic, or another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 230. An advertisement request includes advertisement content and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an advertisement by an advertiser, or another party on behalf of the advertiser. The bid amount is used to determine an expected value, such as monetary compensation, provided by an advertiser to online system 140 if the advertisement is presented to a user, if the advertisement receives a user interaction, or based on any other suitable condition. For example, the bid amount specifies a monetary amount that the online system 140 receives from the advertiser if the advertisement is displayed and the expected value is determined by multiplying the bid amount by a probability of the advertisement being accessed. In some embodiments, the bid amount and bid response are communicated to and from the online system 140 using an ad exchange that facilitates the buying and selling of online media advertising inventory whose prices are determined through bidding from multiple ad networks.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the online system 140. Targeting criteria may also specify interactions between a user and objects performed external to the online system 140, such as on a third party system 130. For example, targeting criteria identifies users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in targeting criteria allows advertisers to further refine users eligible to be presented with content from an advertisement request. As another example, targeting criteria identifies users having a connection to another user or object or having a particular type of connection to another user or object.

The advertising system 150 includes an ad server 235 and various independent services for processing a data stream of messages related to serving an ad. As explained above, the advertising system 150 can be a component of the online system 140, though it can also be a separate entity or advertising platform that interacts with the online system 140. For example, the advertising system 150 may be an advertising platform that allows advertisers to create and manage campaigns, and the online system 140 may be a system that serves to users ads from those campaigns within advertising space available on webpages of the online system 140. In one embodiment, an ad server 235 may be a computer system, such as a web server and a database server that stores ads for delivery to users of the online system 140 via web sites accessed by the online system users. The ad server 235 delivers ads to users of the online system 140, manages the advertising space of a web site for receiving the ad, and provides notifications used by the various independent processing services for counting and tracking information about the distribution of ads. The ad server 235 may serve ads from one or more publishers. The ad server 235 delivers the ads from a central source, and thus may track the distribution of ads for multiple advertisers and publishers. The ad server 235 receives a notification universal resource locator (URL). In embodiments in which the ad system 105 and online system 104 are separate, the ad serve 235 may provide ads to the online system 104 for display on ad space within the online system's website.

The ad server 235 may operate in conjunction with or include one or more services to count the number of ad impressions and/or clicks for an ad, set of ads, or ad campaign and report generation, report information about the served ads to the advertisers, and track the ad spend compared to the goals of the advertiser for an ad or ad campaign. Example services include an ad monitor 240, an ad limiter 245, an ad aggregator 250, and an ad pacer 255. The ad monitor 240 may perform validity checks to detect fraudulent traffic, fraudulent publishers, and fraudulent web site visitors. For example, the ad monitor 240 performs behavioral filing to identify fraudulent web site visitors.

The ad limiter 245 receives an input data stream that includes information indicating that an ad was shown for a specified cost, maps the ad to a higher order identifier, and generates an output data stream that includes an order set comprising a limit identifier and a cost for each ad shown. In an embodiment, the input data stream includes an ordered set that specifies, for each served ad, an ad identifier (id) and an ad cost for the served ad. An example input data stream received by the ad limiter 245 may include the ordered sets <Ad1,C1>, <Ad2,C2> and <Ad3,C3>, where Ad1 and C1 specify the ad id and cost for a first served ad. Similarly, ordered sets Ad2,C2 and Ad3,C3 specify the ad id and cost for a second and third served ad, respectively. The ad id may be represented as a unique numeric or alpha-numeric set of characters for a particular ad. The ad id may be specified by the advertiser, a third party system, or the online system 140. The cost may be a numeric value that represents a monetary value associated with the ad.

The ad limiter 245 also maintains mapping of each ad id to an ad group id. Example ad groups include an ad set, an ad campaign, or group of advertisers associated with multiple ads. The ad group id associated with each ad set, ad campaign, or group of ads may be formatted in a manner similar to the ad id. To enable the online system 140 to optimize the ad budget for specified group of ads, the ad limiter 245 maps the ad group id to a unique ad limit identifier (id). In one embodiment, the ad limit id is a value at which the bidder for a particular group of ads stops bidding. Example ad limits include a monetary value or a range of monetary values. The ad limiter 245 receives information indicating that an ad was served, identifies the ad id of the served ad, maps the identified ad id to a limit id, and increments a count associated with the ad limit id. The ad limiter 245 repeats this operation for each group of ads until the count reaches a threshold corresponding to a value represented by the ad limit id for the specified group of ads. The count is used by the other downstream processes to determine how aggressively the online system 140 bids on an impression and when to stop bidding based on the limit, as described later with reference to the ad pacer 255. In one embodiment, the ad limiter 245 may employ different limit ids for different ad and group types. For example, the ad limiter 245 may use a first set of limit ids for ad sets and a second set of limit ids for ad campaigns. For example, a first ad limiter 245 may map a set of ad set ids to limit ids L1-L5. While a second ad limiter 245 may map a set of ad campaign ids to limit ids L6-L10. Structuring the mapping scheme in such a way allows the online system 140 to better manage and optimize a customer's budget to achieve both an overall campaign goal, but to also achieve goals for individual ad sets within a specific ad campaign.

The ad aggregator 250 receives the output data stream from the ad limiter 245, aggregates the costs associated with each limit id, and manages the restoration of the data in the queue between the ad limiter 245 and the ad aggregator 250 upon a failure of the ad limiter 245. The ad aggregator 250 aggregates all the costs for each limit id by incrementing a counter, and propagates the aggregated information to the ad pacer 255 via a memory cache, which operates as a data distribution mechanism. The ad aggregator 250 maintains in an embedded database system for storing portions of the received data stream. Example embedded database systems include a database system that runs locally on a computing system and listens on and is accessible using a single port. The embedded database included in the ad aggregator 250 is a key value store. For example, when the ad aggregator 250 receives an ordered set <L1, C1> from the ad limiter 245, the embedded database looks up a key associated with L1, adds the value of C1 to a sum S1, and then stores the updated value of S1 in the embedded database. This process is repeated for each received ordered set of limit id and cost. At a specified interval the information stored in the embedded database is transferred to a memory cache, and the values of the resets the sums associated with each key.

To aid in the recovery from a data processing service failure, the ad aggregator 250 creates backups of the data stored in the embedded database when the ad limiter 245 detects control information included in the data stream received from the ad server 235. In one implementation, the control information includes check points that are included in the data stream received from the ad server 235. The checkpoints provide a reference point in the data stream where a process can be restarted and resumed in the event of a failure of a data processing service. The check points are included in the data stream by the online system 140 at specified intervals, which may be configurable by the online system 140. Example intervals include every 10 seconds, every minute, or some other period of time sufficient to recover data from a failure a data processing service. In another implementation, the check points are included in the data stream based on the rate at which data enters the data stream. So that the checkpoints may be used by the ad limiter 245 as a reference point in the data stream where a process can be restarted and resumed in the event of a failure of a data processing service, the check points are stored in a highly durable, consistent, and distributed storage engine 265. In one embodiment, the distributed storage engine 265 is a separate system from the advertising system 150. In one embodiment, the backup of the data stream is stored in a distributed file system 260 separate from the advertising system 150. Information stored in the distributed storage engine 265 and distributed file system 260 may be accessible by the ad limiter 245 or the ad aggregator 250 in the event of a failure of either the ad limiter 245 or the ad aggregator 250.

As previously discussed, the reference points in the data stream refer to locations in the backup of the data stream stored in an embedded database. The contents of the embedded database are backed-up from the embedded database associated with the ad aggregator 250 keyed off of the detection of an occurrence a reference point in the data stream. The backup is stored in a distributed file system 260. Example distributed file systems 260 include Hadoop Distributed File System (HDFS), and other file system that are highly fault- and provide high throughput access to application data and are suitable for applications that have large data sets. By accessing the stored backup of the data stream from the distributed filed system 260, the ad data flow processing from the ad limiter 245 may be resumed upon a failure of the ad aggregator 250.

The web server 270 links the online system 140 via the network 120 to the one or more client devices 110, as well as to the one or more third party systems 130. The web server 270 serves web pages, as well as other content, such as JAVA®, FLASH®, XML and so forth. The web server 270 may receive and route messages between the online system 140 and the client device 110, for example, instant messages, queued messages (e.g., email), text messages, short message service (SMS) messages, or messages sent using any other suitable messaging technique. A user may send a request to the web server 270 to upload information (e.g., images or videos) that are stored in the content store 110. Additionally, the web server 270 may provide application programming interface (API) functionality to send data directly to native client device operating systems, such as IOS®, ANDROID™, WEBOS® or BlackberryOS.

Recovery from Failure of the Consuming Service

During a failure of a sending service, such as the ad limiter 245, messages may be sent multiple times to a consuming service, such as the ad aggregator 250, or dropped prior to reaching the consuming service. When messages are sent multiple times to the consuming service, the ad server may over report. For example, in some data message recovery solutions, if a consuming service fails, upon restart, the consuming service queries an ad server for a last check point. In response, the ad server provides the last check point to the consuming service, which resumes operation from the provided check point. This may result in double counting messages that occurred before the last known check point, and over charging the customer. Alternatively, when messages are dropped, the ad server may under report to the advertiser. For example, in some solutions, the consuming service may restart from the provided check point responsive to a query, read all messages to the next check point and discard them. This situation may result in under counting the messages, and undercharging the customer.

The failure recovery mechanism employed by the disclosed advertising system 150 uses a backup system keyed from the check points as previously described with reference to FIG. 2A. Upon startup from a failure, the ad aggregator 250 queries the distributed storage engine 265 for the last check point, receives the check point, and uses the check point as a reference to access the backup of the embedded database stored in the distributed file system 260 from a point in time corresponding to the retrieved check point. The ad aggregator 250 replaces the current database instance with the backup instance, and replays the messages included in the restored instance of the database from the point of the check point.

Figure 2B:
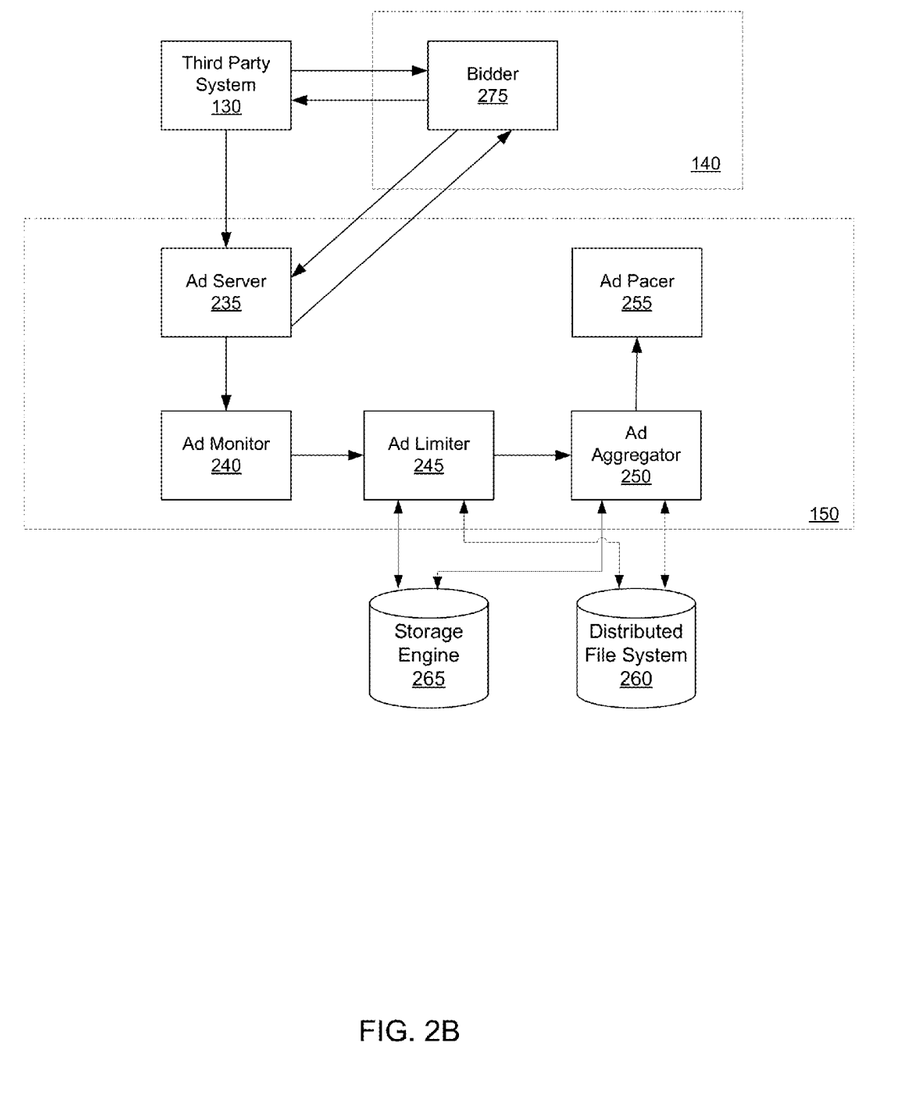
FIG. 2B shows a system diagram describing the data flow processing for serving an advertisement, in accordance with an embodiment.

FIG. 2B shows a system diagram describing the data flow processing for serving an advertisement and the failure recovery mechanism employed by the disclosed advertising system 150, in accordance with an embodiment. As explained above, the advertising system 150 is a system within the online system 140 or a separate system. A third party system 130 and a bidder 275 exchange a bid request for an ad impression and bid response that specifies, among other things, an advertising (ad) creative to serve if the bid response is accepted. The ad creative is an object that contains the data for visually rendering the ad itself. In some implementations, the third party system 130 is an ad exchange and the bidder 275 is a component of the online system 140. In other implementations, the bidder 275 is another third party system that is external and separate from the online system 140. The third party system 130 sends a notification to the advertising system 150 when the bid is accepted. The notification is received by the ad server 235, which in turn, serves the ad to users of the online system 140 or other users who are not members of the online system 140. As described with reference to FIG. 3, the advertising system 150 employs one or more services including an ad monitor 240 to verify the validity of the served ad, an ad limiter 245 and an ad aggregator 250 to track the distribution of ads, recover from failures of processing messages associated with the serving of the ad, and report an accurate accounting of the same. The advertising system 150 also includes an ad pacer 255 to regulate the bidding on ad impressions based on parameters, such as budget, specified by the bidder 275.

Figure 3:
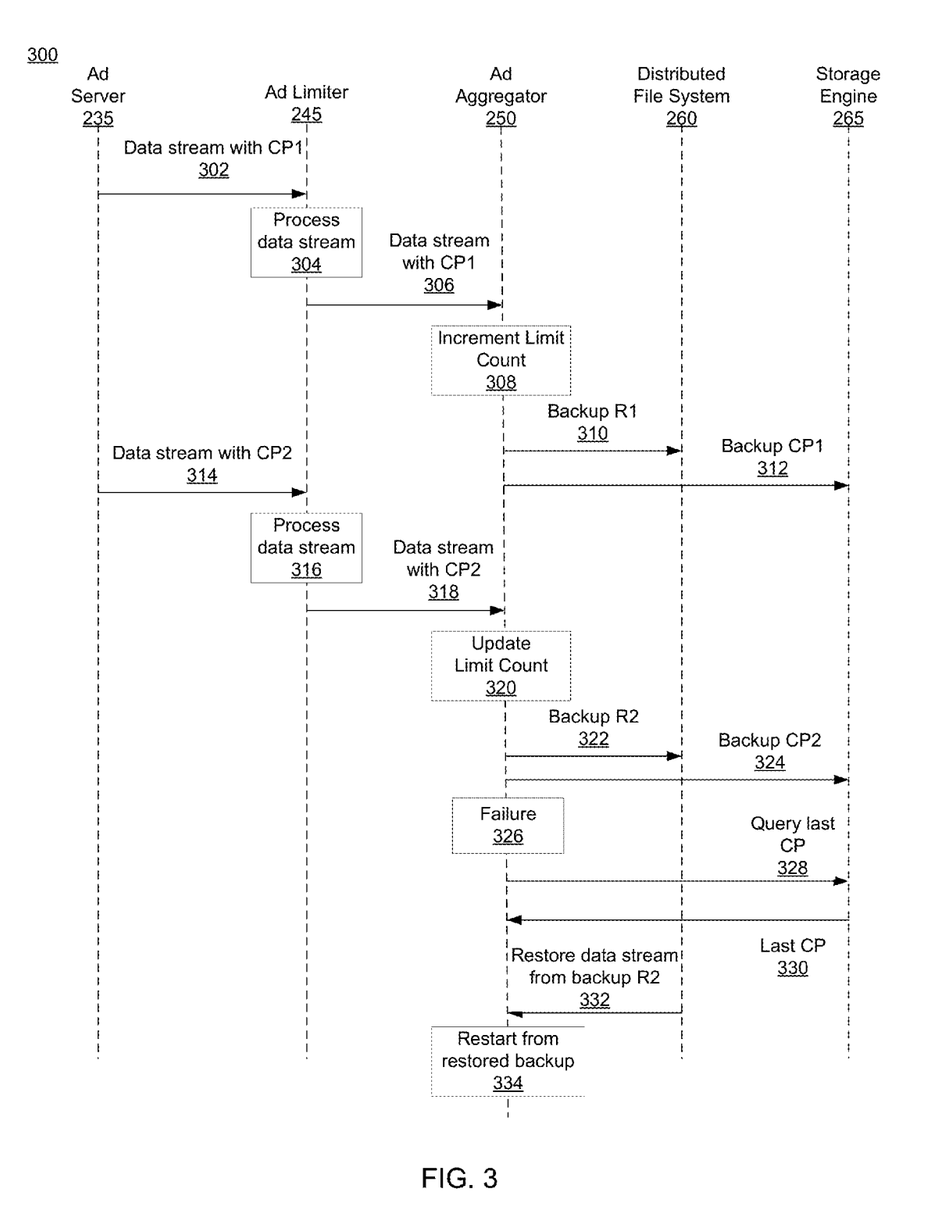
FIG. 3 is an event trace diagram describing the interaction of various components on an online system during the resumption of processing of a data stream from a failure of a processing service, in accordance with an embodiment.

FIG. 3 is an event trace diagram 300 describing the interaction of various components on the online system 140 during the resumption of processing of a data stream from a failure of the ad aggregator 250, in accordance with an embodiment. The ad server 235 sends 302 a data stream comprised of an ordered set of messages containing information about a served ad to the ad limiter 245 and control information for processing. As previously described with respect to FIG. 2, each ordered set may specify the ad id and cost for served ad. The control information includes a check point, which provides a reference points in the data stream where a process can be restarted and resumed in the event of a failure of a data processing service. The ad limiter 245 processes 304 the received data stream by applying one or more functions that identify the ad id, employing a mapping scheme that associates the ad id to a limit id associated with a higher ordered group of ads. Example higher ordered groups of ads may include an ad set, and ad campaign, or a grouping that includes multiple advertisers. The processing performed by the ad limiter 245 sends 306 an output data stream that includes an ordered set of messages, each ordered set specifying a limit id and a cost. An example ad limiter 245 output data stream includes ordered sets of messages $<L_1, C_1>, <L_2, C_2>$ followed by $<CP_1>$ and ordered set $<L_3, C_3>$, where $CP_1$ represents check point 1.

The ad aggregator 250 receives the output data stream from the ad limiter 245 and increments 308 a limit count for each received limit. For example, when the ad aggregator 250 receives an ordered set $<L1, C1>$ from the ad limiter 245, the embedded database looks up a key associated with L1, adds the value of C1 to a sum S1, and then stores the updated value of S1 in the embedded database. This process is repeated for each received ordered set of limit id and cost. Using this example data stream, the ad aggregator 250 stores 310 the contents of the embedded database up to the time at which $CP_1$ occurred in a distributed file system 260 on a computing system that is separate from the computing system that includes the ad aggregator 250. As previously described with reference to FIG. 2B, example distributed file systems include Hadoop Distributed File System (HDFS) or other type of file system with sufficient availability, durability, and throughput to backup the state information that includes historical data stream information. The historical data may include data for multiple days of state information describing the data stream. The contents of the backup stored in location R1 associated with $CP_1$ will include the received limit ids. Using the previously example, the contents backup R1 of the embedded database at the time of the occurrence of $CP_1$ would include limit ids $L_1$ and $L_2$. The ad aggregator 250 also stores 312 the check point $CP_1$ in a distributed storage engine 265 for use as a reference point from which to begin reading the stream upon recovery a failure of the ad aggregator 250.

This cycle is repeated when the ad server 235 includes 314 another check point $CP_2$ in the data stream. An example data stream may include ordered sets $<L_1, C_1>, <L_2, C_2>, <CP_1>, <L_3, C_3>, <CP_2>, <L_4, C_4>$, where $CP_2$ represents check point 2. The ad limiter 245 processes 316 the received data that includes $CP_2$ in a manner similar to that performed in step 304, sending 318 the processed data stream to the ad aggregator 250. The ad aggregator 250 receives the check point $CP_2$, updates 320 the limit count, creates a storage location in the distributed file system for storing 322 a backup of the contents of the embedded database up to the time at which $CP_2$ occurred, and stores 324 the check point $CP_2$ in the distributed storage engine 265. The storage location within the distributed file system 260 associated with $CP_2$ stores the backup R2 that includes the latest copy of the embedded database, which is keyed off of the occurrence of $CP_2$. Backup R2 includes limit ids $L_1$ and $L_2$, along with limit ids $L_3$ and $L_4$ that occurred after $CP_1$ and before $CP_2$.

In the event of a failure 326 of the ad aggregator 250, the ad aggregator 250 can resume processing on startup by sending 328 a query to the distributed storage engine 265 to request the last check point. The ad aggregator 250 retrieves 330 the last check point from distributed storage engine 265, retrieves 332 entire backup of the embedded database keyed off of the last check point, and replaces the present instance of the embedded database on the computing system that includes the ad aggregator 250. The ad aggregator 250 uses the last check point to identify the portion of the data stream in the backup from which to restart 334 the data processing of the data stream.

The ad aggregator 250 also may recover from a failure that occurs after the storage of latest check point but prior to copying the instance of the embedded database keyed off of the latest check point. For an example, data stream:

$<CP_Z>, <L_1, C_1>, <L_2, C_2>, <CP_X>, <L_3, C_3>, <L_4, C_4>,$
$<CP_Y>, <L_5, C_5>$ assuming no failures occur prior to the occurrence of ordered set $<L_3, C_3>$, check point $CP_Z$ is stored in the distributed storage engine 265. When the check point $CP_X$ occurs, $CP_X$ will be stored, and backup R1 is stored, which includes $L_1, C_1$ and $L_2, C_2$. When check point $CP_Y$ occurs, $L_1, C_1$, $L_2, C_2$, $L_3, C_3$, and $L_4, C_4$ are stored in backup R2. If a failure of the ad aggregator 250 occurs after the check point $CP_Y$, but prior to storing the check point $CP_Y$ in the distributed storage engine 265, the ad aggregator 250 queries the distributed storage engine 265 for the last check point. In response the ad server 235 sends the $CP_X$ check point, and the ad aggregator 250 reads the data stream from $CP_X$ of R1, detects the check point $CP_Y$, creates a backup of $L_1, C_1$, $L_2, C_2$, $L_3, C_3$, and $L_4, C_4$ when it reaches $CP_Y$, and stores $CP_Y$ in the distributed storage engine 265. The disclosed system maintains at least two backup copies of the embedded database of the ad aggregator 250 to recover from these types of failures of the ad aggregator 250 to prevent data loss.

In another failure scenario, a new machine may be assigned to handle a set of limit ids in the event of a machine failure. The new machine upon startup may query the distributed consensus system for the check point associated with the set of limit ids. In response to the query, the distributed storage engine 265 provides the requested check point, and the new machine accesses the distributed file system 260 and retrieves the copy of the embedded database keyed off of the retrieved check point, and reads the stream from point in the retrieved copy of the embedded database that corresponds to the retrieved check point.

Recovery from Failure of the Feeding Service

Figure 4:
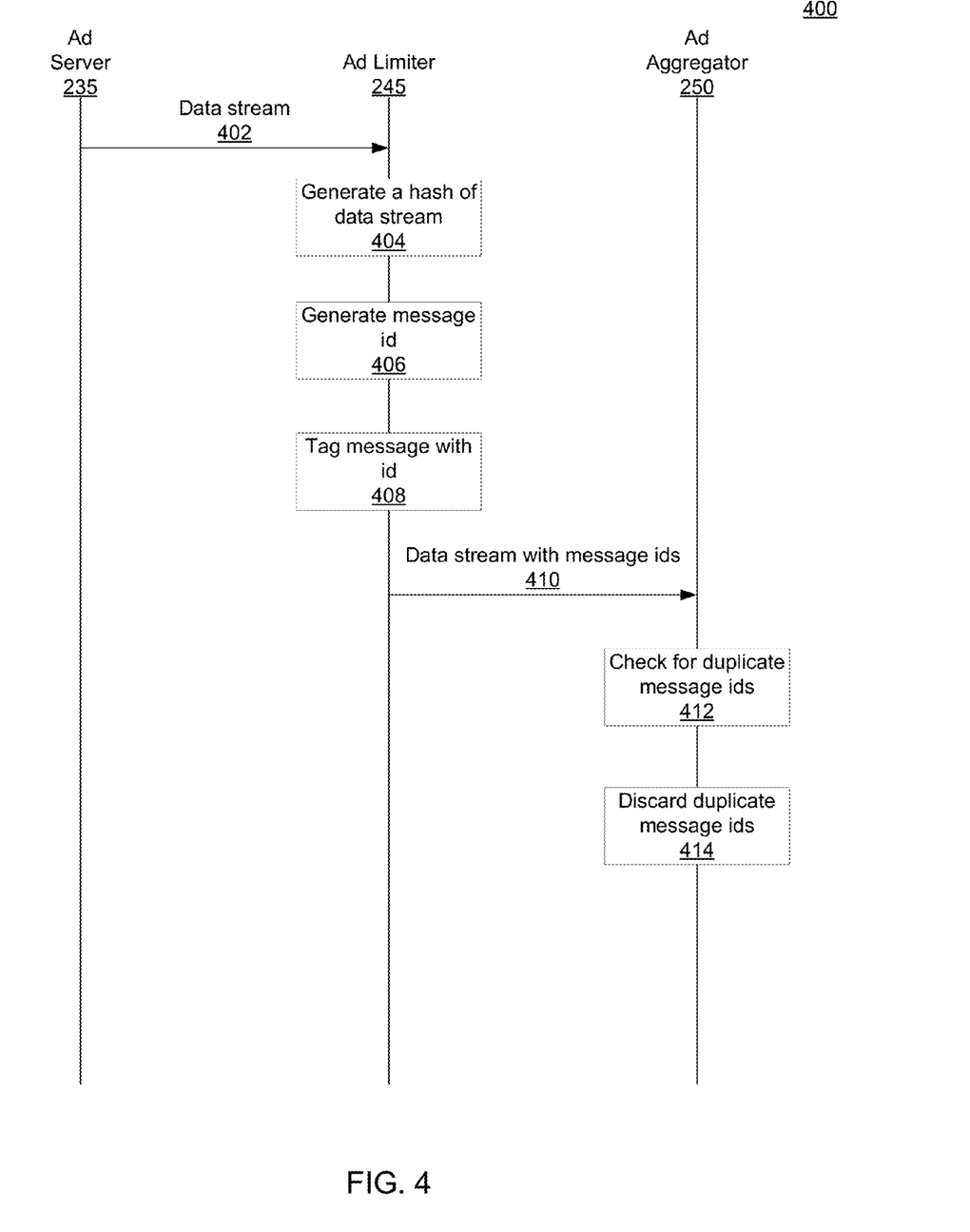
FIG. 4 is an event trace diagram describing the interaction of various components on an online system during the resumption of processing of a data stream from a failure of another processing service, in accordance with an embodiment.

FIG. 4 is an event trace diagram 400 describing the interaction of various components on the online system 140 during the resumption of processing of a data stream from a failure of the ad limiter 245, in accordance with an embodiment. To recover from a failure of the ad limiter 245, the ad limiter 245 associates a unique identifier with each message output to the ad aggregator 250. Using the unique identifier the ad aggregator 250 may determine whether duplicate messages are sent within a specified period of time. In particular, the ad limiter 245 receives 402 messages from the ad server 235 as previously described with reference to FIGS. 2 and 3. For each received message, the ad limiter 245 generates 404 a hash based on components of the received message. Based on the hash, the ad limiter 245 creates 406 a unique identifier for each message. In implementations, the ad limiter 245 may add a specified number of bits of entropy to the hash to create the unique identifier. The ad limiter 245 tags 408 each message with the unique identifier and sends 410 the message to the ad aggregator 250. Although the ad limiter 245 is unaware of whether the messages it sends are received by the ad aggregator 250, the ad aggregator 250 may check 412 for messages received from the ad limiter 245 within a specified time period having duplicate ids. The ad aggregator 250 keeps messages received from the ad limiter 245 in memory for a specified period of time. In one implementation, the specified time corresponds to the time period between consecutive check points. If messages with duplicate ids are detected within the specified time period, the ad aggregator 250 discards 414 one of the message having a duplicate id. Thus, the employed recovery solutions from the ad aggregator 250 and the ad limiter 245 may recover from various failure scenarios without experiencing data loss.

SUMMARY

The foregoing description of the embodiments has been presented for the purpose of illustration; it is not intended to be exhaustive or to limit the embodiments to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

The disclosed embodiments may also relate to an apparatus for performing the operations herein. This apparatus may be specially constructed for specified purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The disclosed embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosed embodiments be limited not by this detailed description, but rather by any claims that issue on an application based hereon. Accordingly, the disclosure of the embodiments is intended to be illustrative, but not limiting, of the scope of the embodiments, which is set forth in the following claims.

What is claimed is:

1. A method comprising:
receiving, by a first processing service, a data stream from an ad server, the data stream comprising a first set of messages and at least one reference point, each message from the first set of messages formatted as an ordered set including an ad identifier and cost information about a served ad;
for each message in the first set of messages, identifying a cost limit identifier associated with the ad identifier;
generating, by the first processing service, a second set of messages, each message from the second set of messages formatted as an ordered set including the cost limit identifier and the cost information about the served ad;
storing, by a second processing service, the second set of messages in a database at specified interval;
responsive to detecting the at least one reference point, storing, by the second processing service, a copy of the database in a file system;
responsive to a failure of the second processing service, retrieving by the second processing service the at least one reference point;
retrieving the copy of the database from the file system; and
reading contents of the copy the database from a location corresponding to the at least one reference point, the copy of the data base retrieved from the file system.

2. The method of claim 1, wherein the copy of the database includes at least a set of the first set of messages received up to an occurrence of the at least one reference point.

3. The method of claim 1, wherein the file system is included in a computing system that is separate from another computing system executing the second processing service.

4. The method of claim 1, further comprising storing, in another memory location separate from the file system, the at least one reference point.

5. The method of claim 1, wherein the at least one reference point corresponds to a location in the data stream where a process can be restarted and resumed in the event of a failure of a processing service.

6. The method of claim 1, wherein for each message in the second set of messages, incrementing a counter value with the cost information about the served ad.

7. A method comprising:
receiving, by a first processing service, a data stream from an ad server, the data stream comprising a first set of messages and at least one reference point, each message of the first set of messages formatted as an ordered set including an ad identifier and cost information about a served ad;
for each message in the first set of messages:
generating a hash value based on components of the message,
generating a message identifier based at least in part on the hash value, and
identifying a cost limit identifier associated with the ad identifier;
generating, by the first processing service, a second set of messages, each message from the second set of messages including a message identifier and formatted as an ordered set including the cost limit identifier and the cost information about a served ad;
receiving, by a second processing service, the second set of messages;

determining, within a specified period, whether at least two messages from the second set of messages have a same message identifier; and discarding at least one of the two messages determined to have the same message identifier.

8. The method of claim 7, wherein the second set of messages includes at least two reference points, wherein a reference point corresponds to location in the data stream where a process can be restarted in the event of a failure of a processing service.

9. The method of claim 7, wherein the specified period corresponds to a time period between two consecutive reference points in the data stream.

10. The method of claim 7, wherein generating a message identifier based at least in part on the hash value further comprises adding a plurality of bits of entropy to the hashed value.

11. A non-transitory computer readable medium comprising instructions that when executed by a processor cause the processor to:

receive, by a first processing service, a data stream from an ad server, the data stream comprising a first set of messages and at least one reference point, each message from the first set of messages formatted as an ordered set including an ad identifier and cost information about a served ad;

for each message in the first set of messages, identify a cost limit identifier associated with the ad identifier;

generate, by the first processing service, a second set of messages, each message from the second set of messages formatted as an ordered set including the cost limit identifier and the cost information about the served ad;

store, by a second processing service, the second set of messages in a database at specified interval;

responsive to a detected at least one reference point, store, by the second processing service, a copy of the database in a file system;

responsive to a failure of the second processing service, retrieving by the second processing service the at least one reference point;

retrieve the copy of the database from the file system; and read contents of the copy the database from a location corresponding to the at least one reference point, the copy of the data base retrieved from the file system.

12. The non-transitory computer readable medium of claim 11, wherein the copy of the database includes at least a set of the first set of messages received up to an occurrence of the at least one reference point.

13. The non-transitory computer readable medium of claim 11, wherein the file system is included in a computing system that is separate from another computing system executing the second processing service.

14. The non-transitory computer readable medium of claim 11, further comprising instructions that cause the processor to store, in another memory location separate from the file system, the at least one reference point.

15. The non-transitory computer readable medium of claim 11, wherein the at least one reference point corresponds to a location in the data stream where a process can be restarted and resumed in the event of a failure of a processing service.

16. The non-transitory computer readable medium of claim 11, further comprising instructions that cause the processor to:

for each message in the second set of messages, increment a counter value with the cost information about the served ad.

17. A non-transitory computer readable medium comprising instructions that when executed by a processor cause the processor to:

receive, by a first processing service, a data stream from an ad server, the data stream comprising a first set of messages and at least one reference point, each message of the first set of messages formatted as an ordered set including an ad identifier and cost information about a served ad;

for each message in the first set of messages:
generate a hash value based on components of the message,
generate a message identifier based at least in part on the hash value, and
identify a cost limit identifier associated with the ad identifier;

generate, by the first processing service, a second set of messages, each message from the second set of messages including a message identifier and formatted as an ordered set including the cost limit identifier and the cost information about a served ad;

receive, by a second processing service, the second set of messages;

determine, within a specified period, whether at least two messages from the second set of messages have a same message identifier; and discard at least one of the two messages determined to have the same message identifier.

18. The non-transitory computer readable medium of claim 17, wherein the second set of messages includes at least two reference points, wherein a reference point corresponds to location in the data stream where a process can be restarted in the event of a failure of a processing service.

19. The non-transitory computer readable medium of claim 17, wherein the specified period corresponds to a time period between two consecutive reference points in the data stream.

* * * * *

UNITED STATES PATENT AND TRADEMARK OFFICE
CERTIFICATE OF CORRECTION

PATENT NO. : 9,606,877 B2
APPLICATION NO. : 14/715393
DATED : March 28, 2017
INVENTOR(S) : Jason George McHugh et al.

Page 1 of 1

It is certified that error appears in the above-identified patent and that said Letters Patent is hereby corrected as shown below:

In the Claims

Column 14, Line 27, Claim 1, after "copy" insert -- of --.

Column 15, Line 43, Claim 11, after "copy" insert -- of --.

Signed and Sealed this
Third Day of October, 2017

Joseph Matal
*Performing the Functions and Duties of the
Under Secretary of Commerce for Intellectual Property and
Director of the United States Patent and Trademark Office*